No. 709,786. Patented Sept. 23, 1902.
W. D. LLOYD.
POWER DRIVEN SAW.
(Application filed Apr. 21, 1902.)
(No Model.)

Attest:
E. P. Hugh

Inventor:
Willmer D. Lloyd,
By Chas. F. Benjamin,
Attorney.

UNITED STATES PATENT OFFICE.

WILLMER D. LLOYD, OF BEAVERFALLS, PENNSYLVANIA.

POWER-DRIVEN SAW.

SPECIFICATION forming part of Letters Patent No. 709,786, dated September 23, 1902.

Application filed April 21, 1902. Serial No. 103,926. (No model.)

*To all whom it may concern:*

Be it known that I, WILLMER D. LLOYD, a citizen of the United States, residing at Beaverfalls, in the county of Beaver and State of Pennsylvania, have invented certain new and useful Improvements in Power-Driven Saws, of which the following is a specification.

This invention relates to power-driven saws fitted with insertible teeth; and its object is both to simplify and strengthen the means of attachment between the saw-plate and its set of teeth.

In saws of this kind it is difficult to so form the tooth-recess as to admit the tooth to its seat and hold it firmly there without injuriously tightening the rim of the saw-plate or causing too much jar upon some material part of the tooth-fastenings or permitting the tooth to sway sidewise in its seat or to twist out of it or to work itself loose and come out, possibly in a harmful manner, if the saw is being rapidly driven or the swaying, twisting, or loosened tooth meets a strong impact or resistance.

My improvements consist in the particular construction and arrangement herein fully described, which are expressly designed to effect the enhanced simplicity and strength of attachment already mentioned as the object of the invention, and I pretend to nothing fundamental in the art to which the invention relates.

Figure 1:
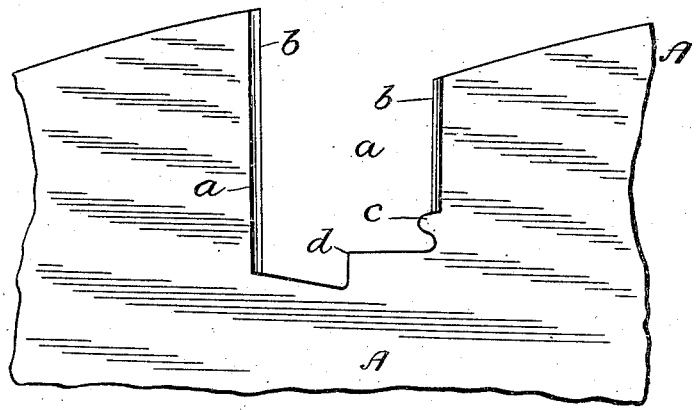
Figure 2:
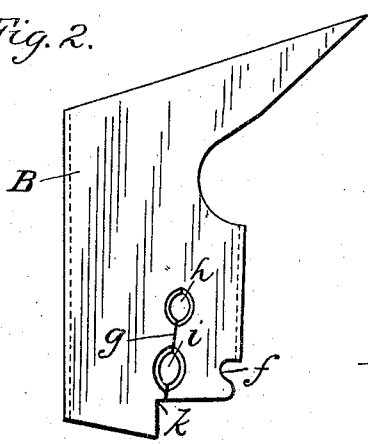
Figure 4:
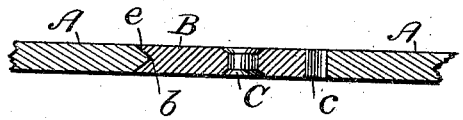
Figure 3:
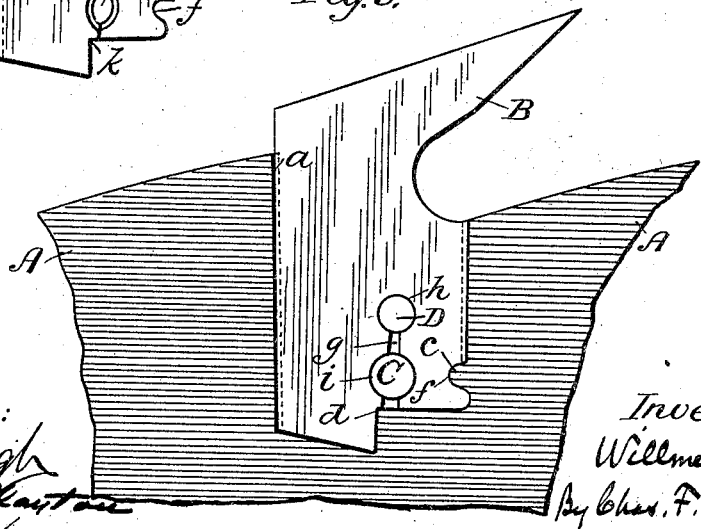

In the accompanying drawings, wherein like letters refer to like parts throughout, Figure 1 is a side view of part of a saw-plate, showing one tooth-recess; Fig. 2, a side view of one saw-tooth in its unexpanded form; Fig. 3, a side view of saw-plate and saw-tooth united with the tooth expanded; and Fig. 4, a horizontal cross-section through plate and tooth, taken through the expanding rivet and the lug on the tooth-recess. In connection with these drawings it is to be remembered that the direction of the point of the tooth is the direction of the motion of the saw and that the opposite direction is that of the strain exerted upon the tooth in the operation of the saw.

A represents a part or segment of a saw-plate, enough to show one tooth-recess and one tooth, which are all that need to be shown. The edge of the plate is of the outline shown, and $a$ represents any of the tooth-recesses in the plate. The recess is of the outline shown, and the narrow face of the recess is beveled on the two sides to a central and fine edge $b$, running along the face. At what is to be considered the front face a lug $c$ is formed near the lower part. At the bottom of the recess and about centrally a step $d$ is formed, leading down to a recess, with a slightly-upward incline in the remainder of the bottom.

B represents any of the set of insertible teeth. A groove $e$ is formed in its sides to fit over the beveled edges of the tooth-recess. In the front face of the tooth is a recess $f$ to receive the lug projected from the tooth-recess. In the body of the tooth a longitudinal flush-edged slit $g$ is cut through, its downward direction being a little obliqued toward the rear of the tooth. At the top this slit opens out into a hole $h$, and toward the bottom of the slit a similar hole $i$ is formed by recessing the two edges of the slit. Nearer still to the bottom of the slit a shoulder $k$ is formed to correspond with the step on the bottom of the tooth-recess. A short blunt rivet C is provided to fit the hole $i$, the rims of which are countersunk, as customary, so that when the rivet is hammered it swells to expand the slit $g$, and its ends form heads in the countersinks, by which it is securely held in place. The tooth in the unexpanded state is of such size that it may be passed down into the recess in the saw-plate clear of the lug $c$ till the bottoms of tooth and recess are in contact. The rivet C is then driven into the hole $i$, expanding the slit $g$ and forming the bottom of the tooth into a dovetail spread and bringing the contact-surfaces of tooth and tooth-recess so tightly together that the union of tooth and plate is almost as firm as though they were integrally forged, the pressure, however, being less near the edge of the saw-plate, where excessive tightening is to be avoided. The lug $c$ prevents lifting of the tooth in its seat, the step and shoulder at the bottom help to meet the shock or impact of resistance from the material operated upon, the bevel-and-groove arrangement prevents swaying or twisting of the tooth, and all these arrangements relieve the jar upon the rivet, which is smoothed off on both surfaces of the tooth when the limit of expansion is reached.

In practice I prefer to fill the hole $h$ with a rivet D, similar to that of the other rivet, as that will somewhat solidify and therefore strengthen the tooth; but I have no reason to believe that its omission would impair the efficiency of the invention. This conclusion is supported by the obvious effect of the step $d$ and the shoulder $k$ in averting strain upon the principal rivet. When the rivet D is used, the rims of the hole $h$ should be countersunk to receive the rivet.

Having fully described my invention, I claim—

The combination in a power-driven saw of the saw-plate, having the edge-beveled, lugged and stepped tooth-recess; the saw-tooth, having the bevel-fitting edge grooves, the lug-fitting recess at the front end, the rigid, step-fitting shoulder at the extreme lower end, the two-holed, oblique, expansible, flush-edged slit in the lower part of the tooth; and the short, blunt rivet fitted expansively to and in the lower of the holes in the slit of the saw-tooth, all substantially as described, for the purpose of simply and strongly attaching the saw-tooth to the saw-plate.

In testimony whereof I affix my signature in presence of two witnesses.

WILLMER D. LLOYD.

Witnesses:
W. R. MITCHELL,
G. L. EBERHART.